Feb. 13, 1934.  C. A. FOX  1,947,154
CASTER ATTACHMENT FOR SLEDS
Filed June 2, 1933
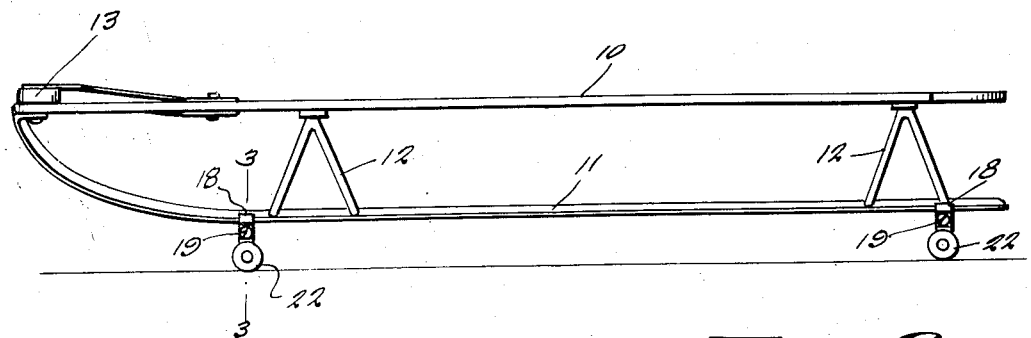
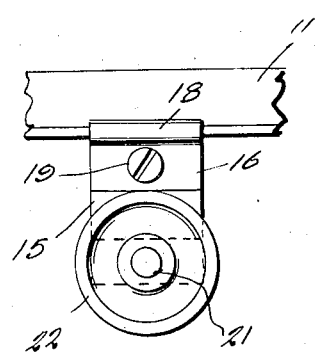
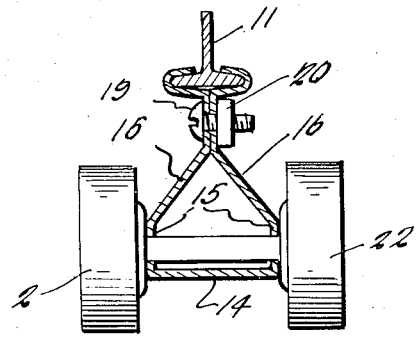
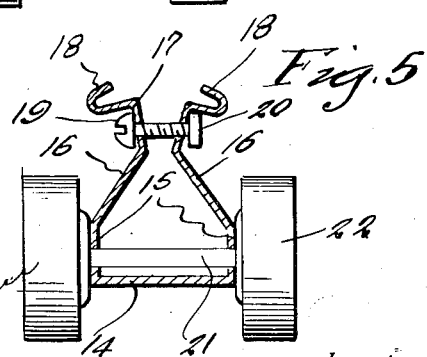
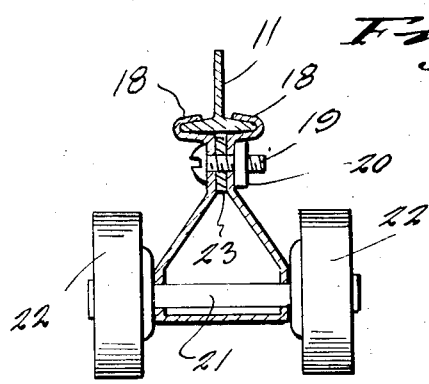
Inventor
C. A. Fox
By *Clarence A. O'Brien*
Attorney Patented Feb. 13, 1934

1,947,154

UNITED STATES PATENT OFFICE 1,947,154

CASTER ATTACHMENT FOR SLEDS

Christian A. Fox, Trenton, N. J.

Application June 2, 1933. Serial No. 674,108

2 Claims. (Cl. 280—8)

This invention relates to roller or caster attachments for sleds and has as its primary object the provision of improved devices of this character capable of being readily attached to the runners of the sled for supporting the same in a manner to enable the sled to be used throughout the year, and particularly for use on the side walk, street and other surfaces in summer and other seasons as well as winter.

Further in accordance with the present invention an attachment of the class above set out is provided that is especially suitable for use on the modern type of inverted T-shaped sled runner, and further to provide such a device which will minimize lateral stress or strain to which the braces of the sled are usually subjected when roller attachments are used thereon.

The invention together with its numerous objects will be best understood from a study of the following description, taken in connection with the accompanying drawing wherein:

Figure 1 is a side elevational view of a sled showing the application of the caster attachment thereto.

Figure 2 is a fragmentary side elevational view of an attachment, the same being shown applied to the sled runner.

Figure 3 is a sectional view taken substantially on the line 3—3 of Figure 1.

Figure 4 is a view similar to Figure 3 of a slightly modified form of the invention, and Figure 5 is a view somewhat similar to Figure 3 showing the attachment detached from the sled, and the jaws of the attachment sprung apart.

Referring to the drawing by reference numerals it will be seen that 10 indicates generally a body or platform of the sled, 11 the runners which in the present instance are of the inverted T-shaped type, a type of runner now universally used; while the reference numerals 12 indicate the braces of the sled. The steering mechanism of the sled is designated generally by the reference numeral 13.

The improved caster attachment comprises a substantially U-shaped frame or clamp, preferably formed from a single length of durable spring metal and providing a base part 14 having vertical integral sides 15 rising therefrom and merging into inclined shank portions 16 connected by straight flat portions 17 with integral runner engaging jaws 18. As is apparent, the jaws 18 are formed by bending the terminals of the sides of the clip at substantially right angles to the parts 17 of the clip and subsequently reversely bending the terminals to provide substantially internally channeled jaws to grip the longitudinal edges of the runner 11 at opposite sides of the rib of the runner as will be clear from a study of Figure 3.

As above stated the clamp is formed of spring metal and through the medium of the angles between the parts 15 and 16, and between the parts 16 and 17 the shanks, due to their inherent resiliency will have a tendency to spring apart for separating the jaws 18 thus facilitating both the attaching of the caster attachment to the sled runner, and a removal of the attachment from said runner.

The parts 17 of the shanks are apertured to accommodate a clamping bolt 19 that has threaded on one end thereof a nut 20. Obviously by tightening up on the bolt 19 the jaws 18 are drawn inwardly towards one another into clamping engagement with the runner 11.

The parallel side portions 15 of the clamp are apertured to receive the axle 21, and the axle 21 has journalled on the ends thereof rollers or wheels 22. The rollers or wheels 22 may be either of the roller bearing, ball bearing, or plane bushing type.

It will also be noted that the nut 20 will be located adjacent to one of the jaws 18 in a manner to prevent casual rotation of the nut, requiring the bolt 19 to be screwed axially of the nut in the proper direction for tightening or loosening the device.

When desired, or should circumstances require, due to the width of the runner 11, a spacer 23 may be arranged on the bolt 19 between the parts 17 of the clamp as shown in Figure 4.

In actual practice two caster attachments are provided for each runner 11 and the front caster attachment as shown in Figure 1 is preferably located forwardly of the front brace 12 while the rear caster attachment is preferably located immediately adjacent the rear leg of the rear brace 12. It will be seen that the front caster attachment is disposed at the point on the runner 11 where the greatest bend takes place in the runner upon manipulation of the steering apparatus 13. The caster attachment at the front of the sled will thus serve to strengthen and support the runners at this point and will serve to minimize the latter stress or strain to which the braces 12 are usually subjected during steering.

It will thus be seen that sleds of the type now generally used may be provided with my improved casters and when so provided is adapted for use upon sidewalks, pavements or upon a floor. Thus, a sled so equipped will permit, during all seasons the indulgence in the sport and amusement incident to the use of a sled during the winter season.

Having thus described my invention, what I claim as new is:—

1. An attachment to a sled adapted to convert the sled into a wheel supported vehicle, said attachment comprising clamps for engaging the runners of the sled, an axle carried by each clamp and wheels journaled on the axle, and each of said clamps being formed of spring metal and including integral oppositely inclined shanks, having at their converging ends straight portions and channel shaped jaws integral with the straight portions and extending laterally therefrom for engagement with the opposite edge portion of the sled runner, and bolt and nut means engaging the straight portions of the shanks for drawing the jaws into clamping engagement with the sled runner.

2. In combination with a sled having runners and front and rear braces for the runners, front and rear clamps for engaging the runners of the sled, an axle carried by each clamp and wheels journaled on the axle, and each of said clamps being formed of spring metal and including integral oppositely inclined shanks, having at their converging ends straight portions and channel shaped jaws integral with the straight portions and extending laterally therefrom for engagement with the opposite edge portions of the sled runner, and bolt and nut means engaging the straight portions of the shanks for drawing the jaws into clamping engagement with the sled runners, said jaws being normally spread apart due to the inherent resiliency of said shank, and the clamps at the front of the sled being arranged in advance of the front braces, and the clamps at the rear of the sled being located immediately adjacent the rear braces.

CHRISTIAN A. FOX.